Dec. 25, 1945.   W. H. THORNHILL   2,391,658
BABY CARRIAGE
Filed June 9, 1944   3 Sheets-Sheet 1

INVENTOR
William Henry Thornhill
BY E. N. Fetherstonhaugh
ATTORNEYS

Dec. 25, 1945.　　W. H. THORNHILL　　2,391,658
BABY CARRIAGE
Filed June 9, 1944　　3 Sheets-Sheet 2

INVENTOR
William Henry Thornhill
BY E. N. Fetherstonhaugh
ATTORNEYS

Dec. 25, 1945. W. H. THORNHILL 2,391,658
BABY CARRIAGE
Filed June 9, 1944 3 Sheets—Sheet 3

INVENTOR
William Henry Thornhill
BY E. N. Fetherstonhaugh
ATTORNEYS

Patented Dec. 25, 1945

2,391,658

UNITED STATES PATENT OFFICE 2,391,658

BABY CARRIAGE

William Henry Thornhill, Montreal, Quebec, Canada

Application June 9, 1944, Serial No. 539,519

9 Claims. (Cl. 280—43)

The invention relates to improvements in baby carriages as described in the present specification and illustrated in the accompanying drawings that form a part of the same.

The invention consists of the novel features of construction, as pointed out broadly and specifically in the claims for novelty following a description containing an explanation in detail of an acceptable form of the invention.

The objects of the invention are to devise a baby carriage, or other vehicle, which will include a mechanism by which the body may be raised and lowered in an approximate vertical direction and at the same time allow the body at all times to be supported by the mechanism; to furnish a carriage with the necessary resiliency so as to give the required tensility, vertically, laterally and horizontally; to construct a carriage with a handle or pushing and steering apparatus which will enable the operator to turn the carriage, quickly and safely, whilst it is moving or not, without jarring the carriage or raising it from off any of the underlying supporting wheels; to devise a carriage which will be simple and easy to operate, with added safety and comfort to the occupancy; and generally to provide a carriage that will be durable in construction and efficient for its purpose.

In the drawings.

Like numerals of reference indicate corresponding parts in the various figures.

Figure 1:
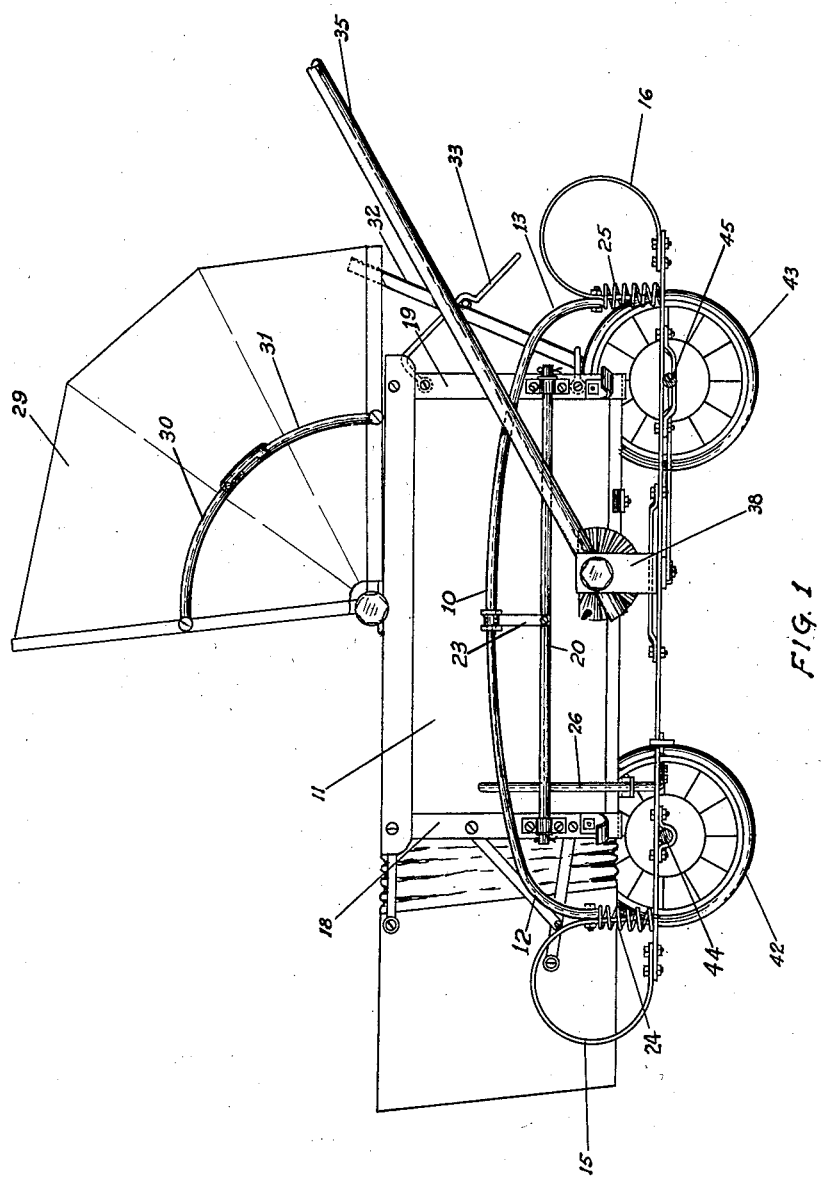
Figure 1 is a side elevation of the carriage showing the body in a lowered position.
Figure 2:
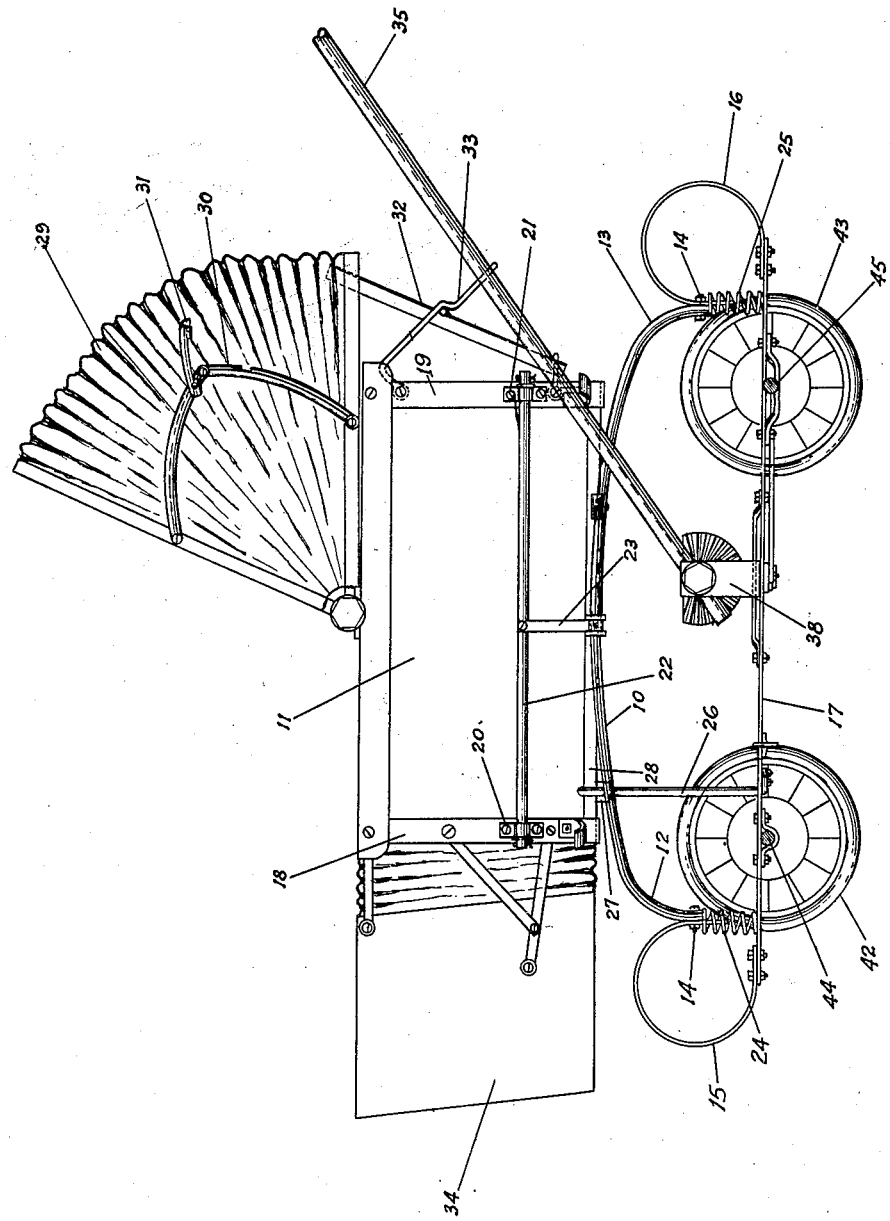
Figure 2 is a side elevation of the carriage having body raised, or elevated.
Figure 3:
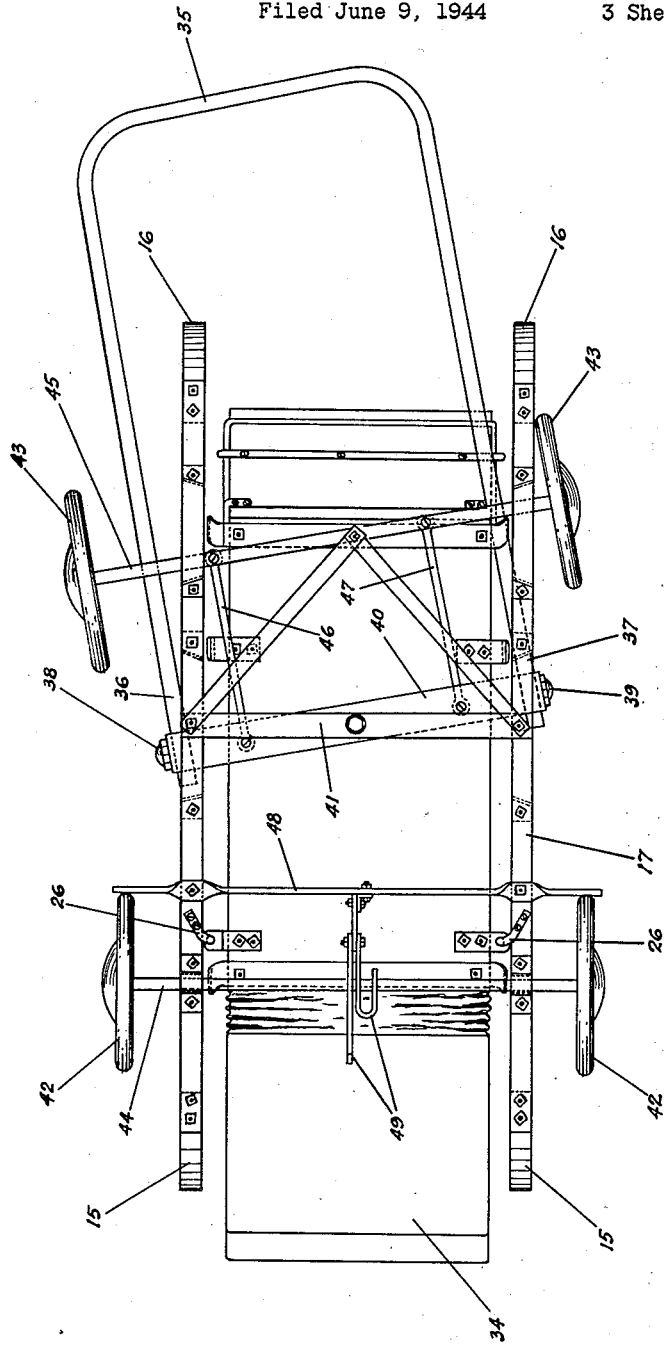
Figure 3 is a plan view of the underside of the carriage.

Referring to the drawings, a curved bar as indicated by the numeral 10 is located on each side of the carriage body 11 and terminates in the curved ends 12 and 13. These curved bars extend longitudinally with the body 11. The curved ends 12 and 13 are suitably secured, such as by the fastening members 14 to the curved spring members 15 and 16, the latter, in turn being bolted or otherwise secured to the chassis 17 or side frame of the undercarriage.

The carriage body 11 is provided with the end frames 18 and 19 having the brackets 20 and 21 secured thereto, and the longitudinal rods 22 are journalled therein and connected to the curved bars 10 by the connected members 23. These connecting members being fixedly secured to the longitudinal rods and encircling the approximately central portion of the curved bars.

The curved spring members 15 and 16 may or may not be further aided in its cushioning utility by the addition of the helical springs 24 and 25 which are supported on the chassis 17 and engage with the free ends of the spring members.

A stabilizer member 26 is located on each side of the carriage body and vertically secured to the chassis and extends through the slotted bracket 27, the latter being secured to the side frame 28 of the carriage body.

This stabilizer, which may also be termed a perpendicular guiding rod, permits the perpendicular raising and lowering of the carriage body with respect to the undercarriage and at the same time maintaining the lateral and longitudinal position of the body to the undercarriage.

The carriage body is also provided with the usual adjustable canopy 29 having an arcuate jointed support 30 on each side and maintained in a rigid position by means of the releasable joint lock 31.

The head rest 32 is located at one end of the carriage body and is adjusted and held in place by the catch bar 33.

The other end of the carriage body may also be provided with the telescopic extension 34.

The steering mechanism for the carriage consists of the U-shaped handle bar 35 having its ends 36 and 37 secured to the adjustable pivot clamps 38 and 39 and thereby permitting longitudinal movement for allowing the handle to be turned over the carriage and thus placing the loop portion of the handle bar from one end of the carriage to the other. These adjustable pivot clamps 38 and 39 are secured to the ends of the moveable cross arm 40 which is pivotally secured to the cross bar 41, in turn rigidly secured to the chassis.

The undercarriage is provided with two pairs of carriage wheels 42 and 43, the former being rotatably mounted on the fixed axle 44 while the latter are rotatably mounted on the moveable axle 45. The connecting rods 46 and 47 are secured to the moveable cross arm 40 and to the moveable axle 45.

A suitable foot brake is also provided and as the brake bar 48 controlled by the double acting lever 49.

In the operation of the invention, the carriage is pulled or pushed in the customary manner as desired, by means of the handle bar, but when it is desired to alter the direction of the carriage, it is accomplished by simply pressing the handle bar to the right or to the left, and the handle bar, being connected to the rear moveable axle by means of the moveable cross member, which turns on the pivot bolt, automatically alters the angle of the rear moveable axle, so that the rear wheels, momentarily thrown out of alignment with the front wheels, cause the direction of the carriage to be changed, quickly and without jolting, when the handle bars are brought back to a parallel position with the chassis of the carriage the rear wheels are in turn brought back into alignment with the front wheels and the carriage permitted to proceed once more in a straight course.

In order to apply the wheel brake, to the front wheels, the foot is pressed to one of the two bars of the brake lever and to release the brake the foot is pressed to the other bar.

In order to alter the elevation of the carriage body, the operator simply pulls the curved spring bar in an outward and downward direction which action forces the supporting bar to draw the turning rod in an upward direction and thus raise the body of the carriage to a higher elevation. In spite of this change of position, the body is still supported on the curved spring bar, in conjunction with the curved springs, by the supporting bar, thus maintaining its resilience. Conversely, to lower the elevation of the carriage body, the operator pulls the spring bar in an outward direction, away from the body, and the supporting bar, drawing downward on the turning rod, automatically pulls the body of the carriage downward, and it is guided into its normal position by the perpendicular guiding rod. In this manner it will be seen that an efficient type of carriage is provided, having an adjustable steering apparatus, an emergency brake, and an adjustable elevating device, which when operated as described will particularly provide a safe and comfortable vehicle, easily controlled, minimising the danger of accidents and efficiently adjustable, having all parts easily accessible for manipulation, adjusting, and repairs when necessary.

What I claim is:

1. In a baby carriage, an undercarriage, carriage wheels connected to said undercarriage, a carriage body, means for raising and lowering said carriage body in a vertical direction, with respect to said undercarriage, means for preventing lateral and longitudinal motion of said carriage body during the raising and lowering of the same, and a steering mechanism for said running gear.

2. In a baby carriage, an undercarriage, carriage wheels connected to said undercarriage, a carriage body, carriage springs, means in co-operation with said carriage springs for resiliently raising and lowering said carriage body in a vertical direction with respect to said undercarriage, means for preventing lateral and longitudinal motion of said carriage body during the raising and lowering of the same, and a steering mechanism for said running gear.

3. In a baby carriage, an undercarriage, a fixed axle and a moveable axle journalled in said undercarriage, carriage wheels rotatably mounted to said fixed and moveable axles, carriage springs, means in co-operation with said carriage springs for resiliently raising and lowering said carriage body in a vertical direction with respect to said undercarriage, means for preventing lateral and longitudinal motion of said carriage body during the raising and lowering of the same and a steering mechanism connected to the moveable axle of said undercarriage.

4. In a baby carriage, an undercarriage, a fixed axle and a moveable axle journalled in said undercarriage, carriage wheels rotatably mounted to said fixed and moveable axles, brackets secured to the exterior sides of said carriage body, longitudinal rods journalled in said brackets, moveable curved bars resiliently secured to said undercarriage, connecting members connecting said longitudinal rods and curved bars to one another, means for preventing lateral and longitudinal motion of said carriage body during the raising and lowering of the same and a steering mechanism connected to the moveable axle of said undercarriage.

5. In a baby carriage, an undercarriage, a fixed axle and a moveable axle journalled in said undercarriage, carriage wheels rotatably mounted to said fixed and moveable axles, brackets secured to the exterior sides of said carriage body, longitudinal rods journalled in said brackets, curved spring members secured to said undercarriage, curved bars having their ends secured to said curved spring members, connecting members connecting said longitudinal rods and curved bars to one another, means for preventing lateral and longitudinal motion of said carriage body during the raising and lowering of the same, and a steering mechanism connected to the moveable axle of said undercarriage.

6. In a baby carriage, an undercarriage, a fixed axle and a moveable axle journalled in said undercarriage, carriage wheels rotatably mounted to said fixed and moveable axles, brackets secured to the exterior sides of said carriage body, longitudinal rods journalled in said brackets, moveable curved bars resiliently secured to said undercarriage, connecting members connecting said longitudinal rods and curved bars to one another, vertical guide rods secured to said undercarriage and extending through slotted brackets secured to said carriage body and a steering mechanism connected to the moveable axle of said undercarriage.

7. In a baby carriage, an undercarriage, a fixed axle and a moveable axle journalled in said undercarriage, carriage wheels rotatably mounted to said fixed and moveable axles, carriage springs, means in co-operation with said carriage springs for resiliently raising and lowering of the same, a rigid cross bar secured to said undercarriage, a moveable cross arm pivotally secured to said rigid cross bar, adjustable pivot clamps secured to the ends of said moveable cross arm, a U-shape handle having its ends pivotally secured to said clamps, and connecting members connecting said moveable cross arm to said moveable axle.

8. In a baby carriage, an undercarriage, a fixed axle and a moveable axle journalled in said undercarriage, carriage wheels rotatably mounted to said fixed and moveable axles, carriage springs, means in co-operation with said carriage springs for resiliently raising and lowering of the same, a rigid cross bar secured to said undercarriage, a moveable cross arm pivotally secured to said rigid cross bar, adjustable pivot clamps secured to the ends of said moveable cross arm, a U-shape handle having its ends pivotally secured to said clamps, connecting members connecting said moveable cross arm to said moveable axle, and a transverse brake bar suitably supported and a foot controlled doubled acting lever connected to said brake bar.

9. In a baby carriage, an undercarriage, a fixed axle and a moveable axle journalled in said undercarriage, carriage wheels rotatably mounted to said fixed and moveable axles, carriage springs, means in co-operation with said carriage springs for resiliently raising and lowering of the same, a rigid cross bar secured to said undercarriage, a moveable cross arm pivotally secured to said rigid cross bar, adjustable pivot clamps secured to the ends of said moveable cross arm, a U-shape handle having its ends pivotally secured to said clamps, connecting members connecting said moveable cross arm to said moveable axle, and a transverse brake bar suitably supported and a foot controlled doubled acting lever connected to said brake bar, and an adjustable canopy having an arcuate jointed support on each side and maintained in a rigid position by means of a releasable curved joint lock.

WILLIAM HENRY THORNHILL.